Sept. 8, 1970 M. KRAKINOWSKI 3,527,956

SWITCH ARRANGEMENT

Filed Aug. 20, 1969 3 Sheets-Sheet 1

INVENTOR
MORRIS KRAKINOWSKI

BY Harry M Weiss
ATTORNEY

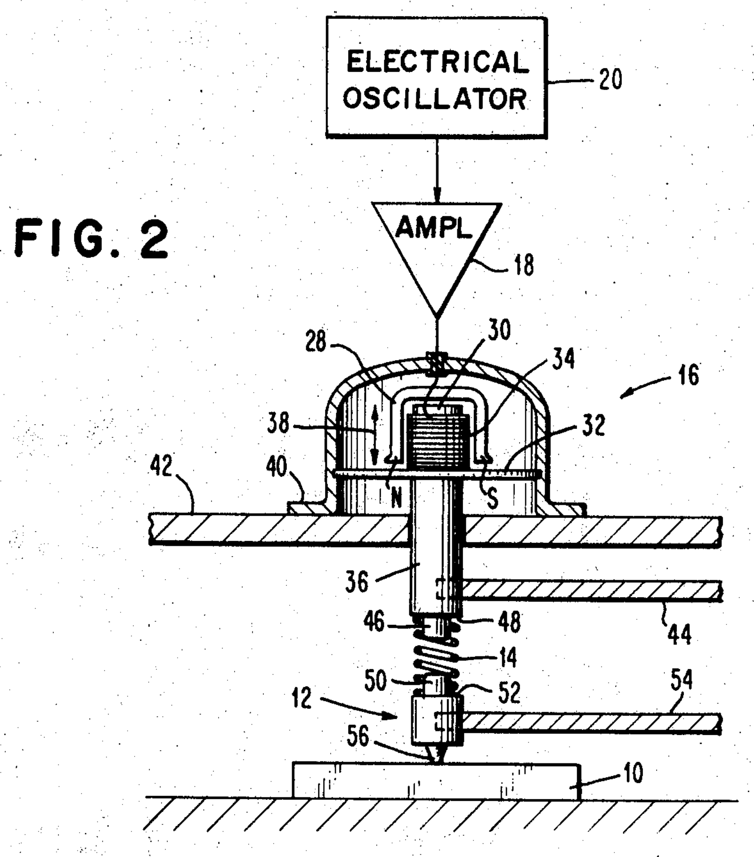
FIG. 3
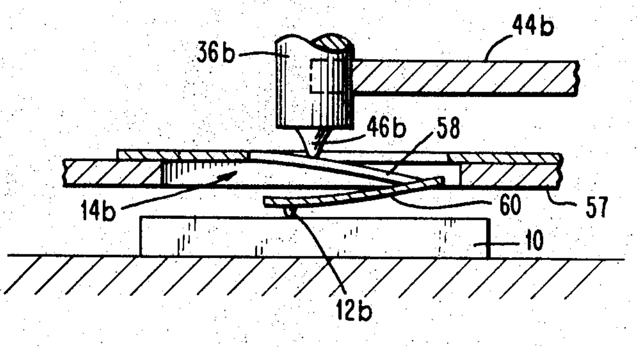
FIG. 3a
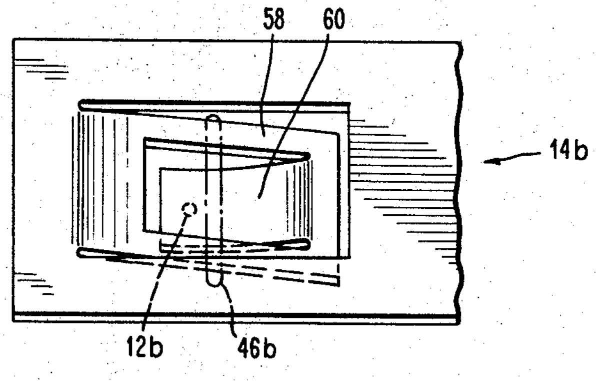

United States Patent Office
3,527,956
Patented Sept. 8, 1970

3,527,956
SWITCH ARRANGEMENT

Morris Krakinowski, Ossining, N.Y., assignor to International Business Machines Corporation, Armonk, N.Y., a corporation of New York Continuation-in-part of application Ser. No. 697,872, Jan. 15, 1968. This application Aug. 20, 1969, Ser. No. 857,289
Int. Cl. H01h 3/60
U.S. Cl. 307—134 26 Claims

ABSTRACT OF THE DISCLOSURE

This is a switch arrangement for permitting high frequency electrical switching operations without electrical contact "chatter" or "bounce." This switch arrangement permits either a high frequency electrical or mechanical input to be utilized for actuating an Elastic Diaphragm Switch by means of a mechanical oscillator, switch actuator, and a coupling spring which is cooperatively connected between the mechanical oscillator and the switch actuator.

CROSS REFERENCE TO RELATED APPLICATIONS

This is a continuation-in-part of U.S. application S.N. 697,872, filed Jan. 15, 1968, now abandoned.

BACKGROUND OF THE INVENTION

Field of the invention

This invention relates generally to a switch arrangement and, more particularly, to a "chatter free" or "no bounce" mechanical switch arrangement which is adapted to be actuated by a high frequency electrical or mechanical input.

Description of the prior art

In the past high performance mechanical switches were either designed to have their electrical contacts close without "chattering" or electrical filter means were provided, for the switch, to eliminate or minimize the spurious signal effect of contact bounce which would generally create erroneous signals. With regard to the electrical filter means technique of suppressing signals caused by contact "chatter," U.S. Pat. No. 3,059,146, assigned to the same assignee of this patent application, discloses a circuit that is used to eliminate the effect of contact bounce. While certain advantages are prevalent with this electrical filter means technique such as the ability to use either low cost or high speed mechanical switches, it is better to avoid the expense and sophistication required when utilizing electrical filter means. In addition, most electrical filter techniques function at high speed, i.e., microsecond range, while the duration of the contact bounce of a mechanical switch is in the millisecond range thereby providing incompatible speed ranges between the electrical filter and the mechanical switch.

U.S. Pat. No. 3,308,253, which was filed in the name of the same inventor of this invention and assigned to the same assignee, is directed to the "chatter free" or "no bounce" type mechanical switch. The switch of U.S. Pat. No. 3,308,253 is known in the art as an Elastic Diaphragm Switch (EDS) which utilizes a metal coated elastic diaphragm for making electrical contact, upon actuation, with a metal contact deposited on an insulating substrate spaced from the diaphragm contact. The EDS of U.S. Pat. No. 3,308,253 alone could not be used for very high speed or frequency switching operations since the EDS essentially functions as a non-linear switch due to the action of the diaphragm in response to the applied force necessary to achieve the deflection required for closing the switch. The applied force required to deflect the diaphragm increases at a greater rate than the deflection rate of the diaphragm thereby resulting in the non-linear performance of the switch. Accordingly, without some means of translating or transferring the high frequency mechanical or electrical input, the EDS could not directly receive such an input for high speed switching operations. Hence, the primary use for the EDS was for low level switching applications at low voltage and current levels (10–12 volts DC, 100 milliamperes). The EDS structure was also found to be suitable for "dry-circuit" switching at even lower voltage and current levels (1 volt, 100 microamperes).

This invention is directed to the "no bounce" or "chatter free" type of mechanical switch and is especially adapted for use in cooperative combination with the Elastic Diaphragm Switch shown and described in U.S. Pat. No. 3,308,253.

In this cooperative combination switch arrangement, the EDS is capable of "chatter free" contact performance with high frequency mechanical or electrical inputs. This permits utilization of the switch arrangement of this invention for high speed keyboard or timing applications where contact bounce on the order of 5 to 10 milliseconds cannot be tolerated. Digital Equipment normally operates at such high speeds that contact bounce of any kind is sensed as multiple closures.

SUMMARY OF THE INVENTION

Accordingly, it is an object of this invention to provide an improved switch arrangement.

It is another object of this invention to provide an improved mechanical switch adapted to receive a high frequency mechanical or electrical input.

It is still another object of this invention to provide an Elastic Diaphragm Switch in combination with elements or means for actuating the EDS at very high frequencies.

It is still a further object of this invention to provide a system for converting high frequency mechanical or electrical signals into identifiable electrical output pulses.

Briefly described, this invention relates to a switch arrangement which comprises means for applying high frequency oscillations that can be provided by either electrical or mechanical inputs. Linear resilient means cooperatively coupled to the high frequency oscillation means provide a reciprocating force corresponding to the motion of the high frequency oscillation means. Preferably, the linear resilient means is a spring.

The switch arrangement also comprises switch means including non-linear resilient means having electrical contacts associated therewith. The switch means is responsive to the reciprocating force provided by the linear resilient means to the non-linear resilient means so as to generate an electrical signal upon closing of the electrical contacts. Preferably, the switch means is the Elastic Diaphragm Switch of U.S. Pat. No. 3,308,253. Actuator means can be inserted between the switch means and the linear resilient means for the purpose of effecting closing of the contacts of the switch means.

The foregoing and other objects, features and advantages of the invention will be apparent from the following more particular description of preferred embodiments of the invention, as illustrated in the accompanying drawings.

DESCRIPTION OF THE DRAWINGS

FIG. 2 is a side elevational view, partly in section and partly in block form, showing one of the systems of FIG. 1 and the relationship of the elements of the switch arrangement including the Elastic Diaphragm Switch;

FIG. 3 is a side elevational view, partly in section, showing a switch arrangement in accordance with another embodiment of this invention;

FIG. 3*a* is a top view showing the folded cantilever spring of the embodiment of FIG. 3;

Referring now to FIG. 1, Elastic Diaphragm Switch 10 shown in block form at the bottom of the figure, which is preferably the same switch as the Elastic Diaphragm Switch shown in U.S. Pat. No. 3,308,253, is actuated by means of actuator 12. Actuator 12 is a mechanical element that is reciprocated to close and open contacts of the Elastic Diaphragm Switch by displacing the diaphragm which is in constant contact with the actuator 12. Actuator 12 is caused to reciprocate by means of oscillations coupled by spring 14 from mechanical oscillator 16.

Spring 14 is a linear resilient element that serves a coupling function by transforming or applying force exerted by the mechanical oscillator 16 at one end of the spring 14 to a corresponding force on the actuator 12 in contact with the other end of the spring 14. The spring 14, unlike the diaphragm of the Elastic Diaphragm Switch 10, is a linear acting element since the force exerted by the spring 14 is directly proportional to the displacement of the spring 14. Accordingly, the spring 14 closely follows the magnitude and frequency of the force exerted on the spring by the mechanical oscillator 16 and causes the actuator 12, because of the coupling effect of the spring 14, to simulate the movement of the mechanical oscillator 16. The actuator 12 thereby is elastically suspended above and in contact with the diaphragm of the Elastic Diaphragm Switch 10. The spring 14 also functions, preferably, to apply a pre-load of, for example, 5 to 50 grams which is, by means of the actuator 12, placed on the diaphragm of the Elastic Diaphragm Switch 10. The deflection of the diaphragm of the Elastic Diaphragm Switch 10 due to this pre-load is not sufficient to close the switch, but enables the switch to sensitively respond to a small force applied by the mechanical oscillator 16 to the spring 14 and thereby to the actuator 12.

Figure 1:
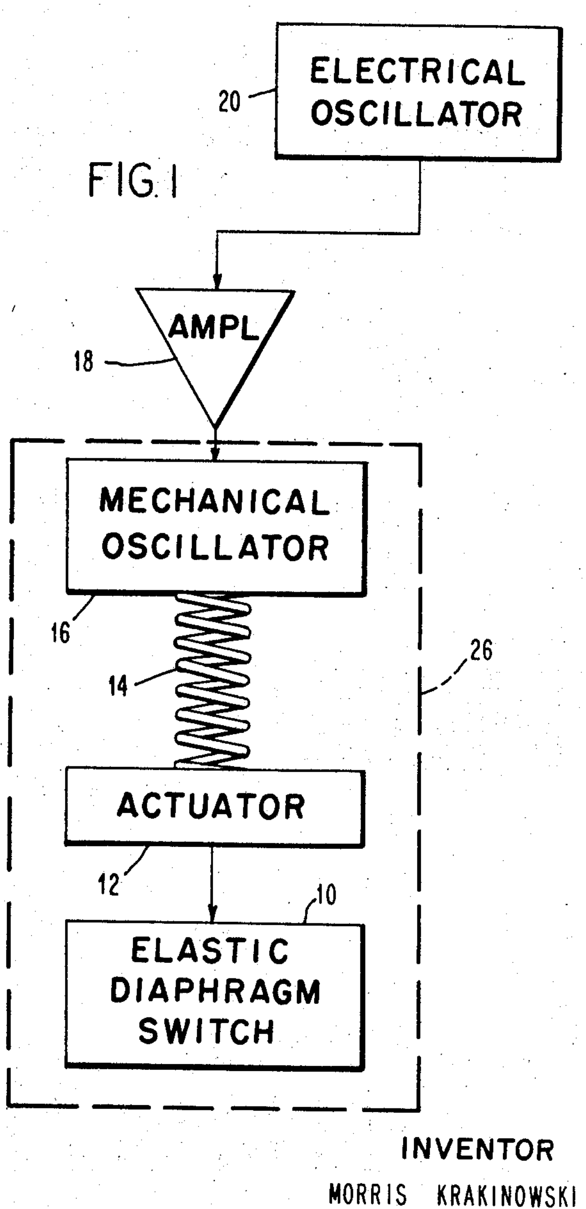
FIG. 1 is a diagrammatical representation, substantially in block form, showing a system for converting amplified high frequency electrical signals supplied from an electrical oscillator into output pulses using the switch arrangement of this invention.

The preload force applied by the linear resilient means, in this case spring 14, is sufficient to keep the actuator mask 12 in continual contact with the non-linear resilient means, represented in FIG. 1 as the elastic diaphragm switch 10. The magnitude of the preload force is such that the inherent forces (inertia forces) of the system do not override the static preload force. Thus, the preload force has a function in addition to that of providing more sensitive, fast operation. It also insures stable switching and efficient coupling of the driving force to the non-linear resilient means.

The mechanical oscillator 16 is caused to oscillate by means of amplifier 18 which is connected to an electrical oscillator 20. The electrical oscillator 20 is a conventional sine wave oscillator having an operating frequency of, for example, 120 cycles per second. The mechanical switch arrangement encompassed by the broken-line box 26 of FIG. 1 is capable of responding to the amplified sinusoidal electrical input from the electrical oscillator 20 for a frequency range of from about 1–1,200 cycles per second without any contact "bounce" or "chatter" in the Elastic Diaphragm Switch 10.

An electrical signal generator and a wave shaper would also serve, in combination, to provide a sinusoidal wave energy input into the amplifier 18 and would therefore, perform a substantially equivalent function as compared with the electrical oscillator 20. Accordingly, a selected electrical energy input would by means of the wave shaper and the amplifier be translated into a specific representative electrical output due to the function of the mechanical switch arrangement, including the Elastic Diaphragm Switch 10, connected to the amplifier 18.

Figure 1A:
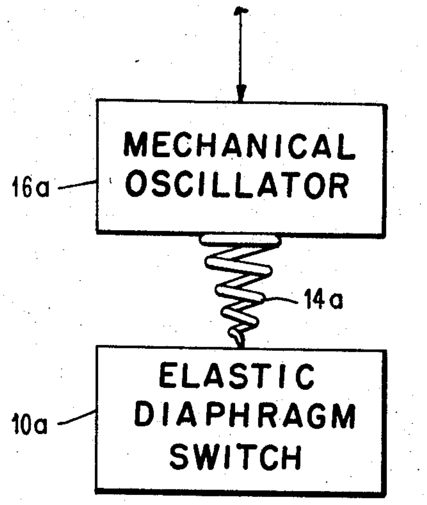
FIG. 1*a* is a diagrammatical representation of an alternate switch arrangement that can be substituted for the switch arrangement shown within the broken-line box of FIG. 1.

With reference to FIG. 1*a*, a variation of the elements shown in box 26 of FIG. 1 is shown. Similar reference numbers are used to designate corresponding elements in FIG. 1 with the additions of the letter *a* in this variation or combination. Mechanical oscillator **16*a* is mechanically coupled to Elastic Diaphragm Switch 10*a* by means of spring 14*a* which is shown having a conical configuration. In this embodiment, oscillations of the mechanical oscillator 16*a* directly affect the operation of the Elastic Diaphragm Switch 10*a* by means of coupling spring 14*a* without the use of an actuator as shown in FIG. 1. The apex of spring 14*a*, being conical in configuration, applies a force on the diaphragm of the EDS 10*a*. In this manner, oscillations of the mechanical oscillator 16*a* are directly coupled to open and close the Elastic Diaphragm Switch 10*a*** without contact "bounce" or "chatter."

Referring to FIG. 2, a more detailed view of one of the systems of FIG. 1 is shown. The mechanical oscillator 16 comprises a permanent magnet pole piece 28 within which is mounted a dielectric cylinder 30 connected to a disk shaped dielectric member 32. Electrical coil 34 shown would around cylinder 30 is electrically connected to the amplifier 18. Accordingly, in the same manner as the operations of similar elements of a speaker, changing magnetic fields set up by sinusoidal signals supplied to the coil 34 from the amplifier 18 either line up with or against the magnetic field produced by the pole piece 28 thereby causing the cylinder 30 with its connected disk shaped number 32 to oscillate corresponding to the input signal applied to the coil 34. Plunger member 36 is connected to the disk shaped member 32 and also oscillates with the cylinder 30 and the disk shaped member 32 as shown by the arrows 38. The mechanical oscillator assembly 16 is secured by means of flange 40 to a fixed support 42 by the use of bolts (not shown). Flexure band 44, preferably of thin, resilient, stainless steel, is connected to the plunger member 36 and thereby functions as a flexible guide for the plunger member 36. The flexure band 44 preferably has a U-shaped portion which is connected to the cylindrical shaped plunger member 36. The other end of the flexure band 44 is connected to a fixed support (not shown).

Coupling spring 14 is mounted about reduced portion 46 of the plunger member 36 on an annular seat 46 located near the bottom of the plunger member 36. The coupling spring 14 is also mounted about reduced portion 50 of the actuator 12 on an annular seat 52 of the actuator 12. In this manner, oscillations, produced by electrical energy applied to the coil 34 of the mechanical oscillator 16 from the amplifier 18 connected to the electrical oscillator 20, serve to be transferred to the actuator 12, by means of the cooperative resilient connection of the coupling spring 14 to both the actuator 12 and the oscillating plunger 36 of the mechanical oscillator 16. Flexure band 54 performs a similar function for the actuator 12 as the flexure band 44 accomplishes for the plunger 36. Accordingly, oscillating motion by the actuator 12 serves to open and close the contacts of the Elastic Diaphragm Switch 10 in response to the pressure of pointer 56 of the actuator 12 on the diaphragm of the Elastic Diaphragm Switch 10.

Referring to FIG. 3, similar reference numbers will be used to designate similar elements shown in FIG. 2 with the addition of the letter *b*. In this embodiment, a folded cantilever spring **14*b* is used instead of the conventional spring 14 shown in FIGS. 1 and 2. Element 46*b* of the plunger 36*b* is in mechanical contact with a portion of the folded cantilever spring 14*b* thereby causing the spring 14*b* to be compressed and expanded depending upon the position of the plunger 36*b*. Compression of the folded cantilever spring 14*b* by downward motion of the plunger 36*b* causes the actuator 12*b*, which is part of or connected to the bottom portion of the folded cantilever spring 14*b*, to deform the diaphragm of the Elastic Diaphragm Switch 10*b* thereby closing the circuit. Support 57 is provided for the cantilever spring 14*b***.

Referring to FIG. 3*a*, a top view is shown of the folded cantilever spring **14*b* of FIG. 3. In this figure, the folded cantilever spring 14*b* has a first resilient contact portion 58 and a second resilient contact portion 60 formed within the first resilient contact portion 58. Pressure applied by element 46*b* on the first resilient contact portion 58 causes the actuator 12*b* which is connected to the bottom of the second resilient contact member 60 to deform the diaphragm of the Elastic Diaphragm Switch 10*b* and thereby close the contacts. If desired, multiple folded cantilever springs can be used which can be actuated by one or more actuators to close different switches in the Elastic Diaphragm Switch 10*b***.

Figure 4:
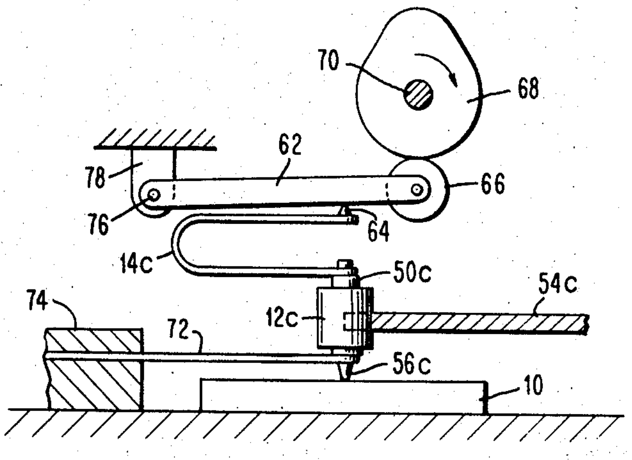
FIG. 4 is a side elevational view, partly in section, of a switch arrangement in accordance with another embodiment of this invention.

With reference to FIG. 4, an alternative switch arrangement embodiment is shown wherein elements similar to the corresponding elements of FIG. 2 are designated by the same number with the addition of the letter *c*. In lieu of the mechanical oscillator 16 of FIGS. 1 and 2, the compression of U-shaped coupling spring **14*c* is caused by the reciprocating movement of cam follower arm 62 which is in contact with member 64 that is connected to a portion of the coupling spring 14*c*. The cam follower arm 62 is caused to oscillate by means of the reciprocating motion of cam follower 66 as it follows cam 68. A keypunch, for example, is used to rotate shaft 70 to actuate cam 68. In this manner, member 56*c* of the actuator 12*c* which is actuated by the coupling spring 14*c* is caused to deform the diaphragm of the Elastic Diaphragm Switch 10*c* thereby closing the contacts thereof. The action of differential loading leaf spring 72 serves, because of its preloaded condition, to apply a force against the displacement applied by the roller 66. Hence, this results in the existence of differential forces with the force on the EDS being small with respect to the force applied to the roller 16. The leaf spring 72 is connected to fixed member 74. Accordingly, the closing of the circuit in the Elastic Diaphragm Switch 10*c* is created by the overriding force of the actuator 12*c* which is urged downwardly by means of coupling spring 14*c* when the cam follower 66 is in its lower-most position. The cam follower arm 62 is permitted to pivot by means of pin 76 located in member 78** that is connected to a fixed support.

Figure 5:
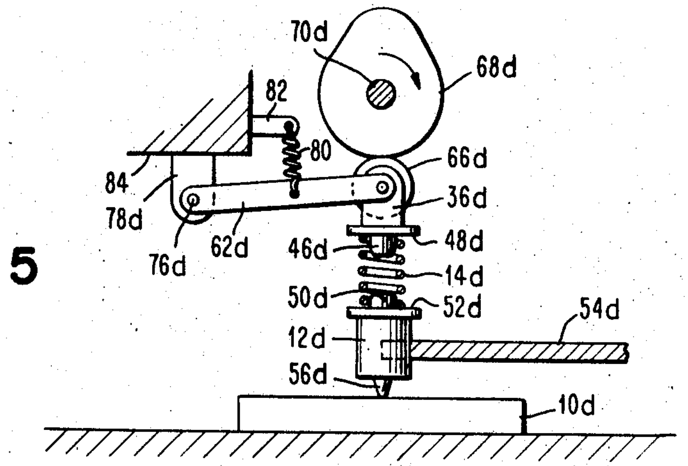
FIG. 5 is a sectional view of a switch arrangement of still another embodiment of this invention.

With reference to FIG. 5, another switch arrangement embodiment is shown. In this figure, elements similar to the corresponding elements of FIGS. 2 and 4 are designated by the same number with the addition of the letter *d*. The Elastic Diaphragm Switch **10*d* is shown actuated by the cooperative actions of cam 68*d*, cam follower 66*d*, plunger 36*d*, spring 14*d*, actuator 12*d*, and member 56*d*. Spring 80 which is connected to the cam follower arm 62*d* is used to return the cam follower 66*d*. The spring 80 is connected by means of arm 82 to fixed support 84**.

Figure 6:
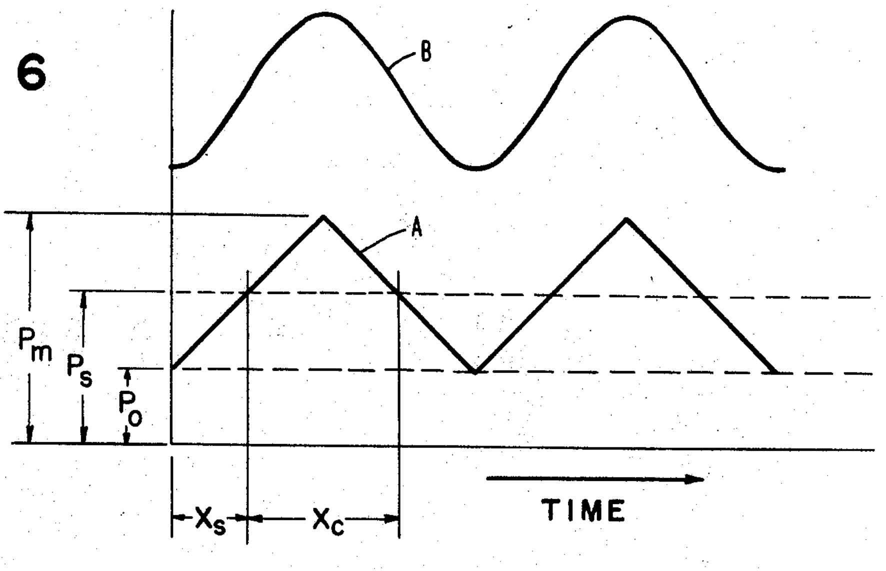
FIG. 6 is a graph showing the relationship between the time (X axis) and the load (Y axis) with respect to the sinusoidal electrical input applied to the switch arrangement of this invention.

Referring to FIG. 6, curve A is a diagrammatical representation of the relationship between the time (X axis) and the load applied to the actuator (Y axis) during closing and opening of the Elastic Diaphragm Switch. As shown in the diagram of FIG. 6, the Elastic Diaphragm Switch is pre-loaded by the compression force $P_o$ of the coupling spring and it is not until the actuator is displaced for a time $X_s$ corresponding to a load $P_s$ applied to the diaphragm of the Elastic Diaphragm Switch that the Elastic Diaphragm Switch is closed. $P_m$ is the maximum load that is applied to the actuator and $X_c$ is the portion of time corresponding to the closing of the Elastic Diaphragm Switch. Sinusoidal waveform B shown in FIG. 6 is representative of the sinusoidal type of oscillation that is applied to the actuator by either mechanical or electrical means. The peaks of curves A and B are related to show the corresponding relationship between the force applied to the actuator and the closing and opening of the Elastic Diaphragm Switch.

As mentioned previously, a major function of the preload force is to keep the actuator mass (driving means) in contact with the non-linear resilient switch means. The preload force keeps these masses from separating when high frequency operation is desired.

In FIG. 6, the preload force is designated by $P_o$. This is a static force exerted by the linear resilient means onto the actuator or the non-linear resilient means. The switching force, i.e. the force required to just close the contacts of the switch is designated $P_s$. The periodic (dynamic) force applied through the linear resilient means to the non-linear resilient means is designated by the curve B. $P_d$ is half of the peak-to-peak amplitude of this changing switching force. In the design of a system having a suitable preload force, the following design considerations are utilized:

(1) $$P_s > P_o > o$$

(2) $$P_o + P_d \geq P_s$$

(3) $$P_o \geq P_d$$

(4) $$P_o \geq P_{s/2}$$

It immediately follows that the applied force $P_m$ is given by:

(5) $$P_s < P_m < 2P_s$$

These equations allow design of a system having a proper preload force. It is to be understood that the equations themselves represent ranges of appropriate preload forces. The preload force can be adjusted to be within this range and is sometimes juggled with other design considerations in order to achieve an optimum system. This will be discussed more fully in the paragraphs to follow.

The relationship between the linear resilient means and the non-linear resilient means is a difficult one to described analytically. The physics of the interaction is very complex. It is difficult to create a precise mathematical model of the system, since the boundary conditions of the differential equations describing the motion of the non-linear resilient means are unknown. In view of this, the expressions which will be developed by linear approximations serve to give design parameters and design ranges which allow construction of workable systems.

If the non-linear resilient means is an elastic diaphragm, as is the case in the elastic diaphragm described in U.S. 3,308,253, the differential equations involve considerations of the membrane action of the diaphragm, the deflections to a fixed amplitude of the diaphragm, the "rolling action" of the diaphragm when the switch contacts are closed, and the fact that the diaphragm acts as an infinite membrane having no boundaries so that all deflections are localized. In order to more fully understand these physical interactions, the reader is referred to a text by J. P. Den Hartog entitled Advance Strength of Material published by the McGraw-Hill Book Company, Inc., 1952. In that text, pages 134–140 are particularly instructive.

Consider a non-linear resilient switch means, and in particular the elastic diaphragm switch previously mentioned. The expression for the spring constant (stiffness)

K($x$) of such a non-linear resilient means is $K=K_0+Kx^n$ where $K_0$=constant, $x$ is the displacement of the resilient means, $n\geq 0$ where $n$ is chosen to approximate the characteristic of the non-linear resilient switch.

The natural frequency of the non-linear resilient means is given by the following linearized expression:

$$(f_n)_{\text{non-linear}}=\frac{1}{2}\pi\frac{\sqrt{Kg}}{W} \tag{6}$$

where W=weight (lbs.) and $g$=gravitational constant.

Because the parameter K varies with amplitude, the natural frequency of the non-linear system also varies with amplitude. Consequently, a linear approximation is used to determine design values. Therefore, it has been calculated that $(f_n)_{\text{non-linear}}$ is approximately 300–600 cycles/sec. This is computed at the amplitude when the switch contacts just meet. At this amplitude, $K_{\text{non-linear}}$ is usually 10–100 pounds per inch.

Study of the linear resilient means leads to the fact that the parameter $K_{\text{linear}}$ is constant for all amplitudes. The parameter K is the slope of the force vs. displacement curve of the linear resilient means and is the ratio of the change in restoring force to the change in displacement of the linear resilient means. Generally $K_{\text{linear}}$ is between 0.5 and 2 pounds per inch. For most linear resilient means the natural frequency $(f_n)_{\text{linear}}$ is between 10 and 50 cycles/sec., at any amplitude of displacement.

From the above, it is apparent that the linear resilient means is much softer than the non-linear resilient means. This can be seen by comparing the values of K for each, since K is a measure of the stiffness of the resilient means.

In order to design a workable system, both the linear resilient means and the non-linear resilient means are analyzed. Knowing the desired range of forcing frequencies then allows the designer to choose a proper linear resilient means. The design steps are the following:

(1) Study of the non-linear resilient means. The amplitude required to close the contacts of the non-linear resilient means is determined and then a linearized approximation of the constant K is derived. This constant is determined at the closing amplitude just mentioned. From this, the natural frequency at this closing amplitude is determined.

(2) Study of the driving mechanism. The designer must know what the forcing frequency $\omega$ will be. In particular, he must know the range of forcing frequencies, since a perfectly discrete frequency is difficult to maintain.

(3) Study of the linear resilient means. Here, the designer must determine the effective mass of the chosen linear resilient means. This is done by normal textbook procedure. The effective mass is the mass which would give the same natural frequency under the same deflection at the point of vibration. Knowing the effective mass, the lowest natural frequency of the linear resilient means is calculated. Having this data, the ratio of the parameters K for the linear and non-linear resilient means can be determined. Also, the ratio of the natural frequencies of the linear and non-linear resilient means at a given point (when switch contacts close) in the operation is determined.

The design range of these ratios is the following:

$$K_{\text{non-linear}}/K_{\text{linear}}=7:1\text{–}30:1$$

$$(f_n)_{\text{non-linear}}/(f_n)_{\text{linear}}=12:1\text{–}30:1$$

If the K ratio is less than 7:1, resonance problems are likely to develop and switch contacts in the non-linear resilient means will oscillate without proper closing. If the ratio is greater than 30:1, there are coupling problems and it is difficult to adjust the required preload force.

(4) The preload is determined by the Equations 1–4 above.

Having this data, a system can be built which will effectively couple the driving force at frequency $\omega$ to the non-linear resilient means such that the switch contacts will not bounce. Generally, the closing force applied to the non-linear resilient means is made approximately two-times the switching force in order to insure that the contacts will close during each cycle of operation (see Equation 5). As stated before, the switching force is that force required to just close the contacts.

While the invention has been particularly shown and described with reference to preferred embodiments thereof, it will be understood by those skilled in the art that the foregoing and other changes in form and details may be made therein without departing from the spirit and scope of the invention.

I claim:

1. A switch arrangement comprising, in combination, means for applying high frequency oscillations;
- linear resilient means cooperatively coupled to said high frequency oscillation means for providing a reciprocating force corresponding to the motion of said high frequency oscillation means, and
- switch means including non-linear resilient means, having electrical contacts associated therewith responsive to the reciprocating force provided by said linear resilient means to said non-linear resilient means for generating an electrical signal upon closing of said electrical contacts.

2. A switch arrangement in accordance with claim 1, including actuator means cooperatively connected between said linear resilient means and said non-linear resilient means of said switch means for applying a force on said non-linear resilient means to close said electrical contacts.

3. A switch arrangement in accordance with claim 1, wherein said linear resilient means comprises a coiled spring.

4. A switch arrangement in accordance with claim 1, wherein said linear resilient means comprises a U-shaped spring.

5. A switch arrangement in accordance with claim 1, wherein said linear resilient means comprises a folded cantilever spring.

6. The switch arrangement of claim 1, wherein said non-linear resilient means is an elastic diaphragm.

7. The switch arrangement of claim 1, wherein said resilient means applies a pre-load force insufficient to operate the electrical contacts of said switch means.

8. A switch arrangement comprising, in combination, means for producing reciprocating motions:
- linear resilient means cooperatively coupled to first said means for transmitting said reciprocating motions;
- non-linear resilient means cooperatively coupled to said linear resilient means for transmitting said reciprocating motions,
- and switch means having electrical contacts associated therewith cooperatively coupled to said non-linear resilient means and responsive to the transmitted reciprocating motions for operating said electrical contacts.

9. A switch arrangement in accordance with claim 8 wherein said resilient means applies a pre-load force insufficient to operate the electrical contacts of said switch means.

10. The switch arrangement of claim 6, wherein said non-linear resilient means is an elastic diaphragm.

11. A switch arrangement comprising, in combination: means for applying oscillations;
- linear resilient means cooperatively coupled to said oscillation means for providing a dynamic force in accordance with the motion of said oscillator, said linear means also providing a static pre-load force;
- switch means including non-linear resilient means having electrical contacts associated therewith responsive to the total force provided by said linear resilient means for generating an electrical signal upon closing of said electrical contacts, said non-linear resilient means being less than approximately 30 times as stiff as said linear resilient means, said pre-load force being at least equal to one-half of said total force required to close said switch contacts.

12. The switching arrangement of claim 11, wherein the ratio of spring constants of said non-linear means and said linear means is in the range of approximately 7:1–30:1.

13. The switch arrangement of claim 11, wherein the ratio of the natural frequency of said non-linear resilient means to the natural frequency of said linear resilient means is in the range of 12:1–30:1.

14. The switch arrangement of claim 11, wherein said oscillator comprises a mechanical oscillator.

15. The switch arrangement of claim 11, wherein said oscillator comprises an electrical generator.

16. The switch arrangement of claim 11, wherein said non-linear resilient means is an elastic diaphragm.

17. A switch arrangement, comprising in combination:

means for producing reciprocating motions;

linear resilient means cooperatively coupled to said first means for transmitting said reciprocating motion and for providing a static displacement;

non-linear resilient means cooperatively coupled to said linear resilient means for receiving said reciprocating motions, the static displacement of said linear resilient means being coupled to said non-linear resilient means for maintaining continual contact of said linear and non-linear resilient means;

switch means having electrical contacts associated therewith cooperatively coupled to said non-linear resilient means and responsive to both the transmitted reciprocating motion and said static displacement for operating said electric contacts, said non-linear resilient means being less than approximately 30 times as stiff as said linear resilient means.

18. The switch arrangement of claim 17, wherein said static displacement is at least equal to one-half the maximum amplitude of said reciprocal motion.

19. The switch arrangement of claim 18, wherein the ratio of the spring constant of said non-linear means to the spring constant of said linear resilient means is between approximately 7:1 and 30:1.

20. The switch arrangement of claim 18, wherein the ratio of natural frequency of said non-linear resilient means to the natural frequency of said linear resilient means is in the range 12:1–30:1.

21. The switch arrangement of claim 18, wherein said non-linear resilient means is an elastic diaphragm.

22. A switch arrangement comprising in combination:

contacts which close on application of a closing force;

non-linear resilient means connected to said switch contacts for applying said closing force to said contacts;

means for providing dynamic force;

linear resilient means connected between said force means and said non-linear resilient means for providing a static force to said non-linear means less than said closing force and for transmitting said dynamic force to said non-linear resilient means, the combination of said dynamic force and said static force having a magnitude at least equal to that of said closing force, said static force being at least one-half as large as said closing force.

23. The switch arrangement of claim 22, wherein the ratio of the spring constant of said non-linear means to the spring constant of said linear means is less than approximately 30/1.

24. The switch arrangement of claim 22, wherein said non-linear resilient means is an elastic diaphragm.

25. The switch arrangement of claim 22, wherein the ratio of the natural frequency of said non-linear resilient means to the natural frequency of said linear resilient means is in the range of approximately 10 to approximately 30.

26. The switch arrangement of claim 22, wherein said static force is at least equal in magnitude to said dynamic force.

References Cited

UNITED STATES PATENTS

| | | | |
|---|---|---|---|
| 2,889,472 | 6/1959 | Myers. | |
| 3,172,017 | 3/1965 | Moakler | 307—129 X |
| 3,304,482 | 2/1967 | Jenks et al. | |
| 3,308,253 | 3/1967 | Krakinowski | 200—86 X |
| 3,315,050 | 4/1967 | Miller | 210—86 X |
| 3,398,328 | 8/1968 | Piekarski | 307—137 X |

ROBERT K. SCHAEFER, Primary Examiner

T. B. JOIKE, Assistant Examiner

U.S. Cl. X.R.

200—153; 307—143; 335—104, 193